(12) United States Patent  
Kake et al.

(10) Patent No.: US 10,762,715 B2  
(45) Date of Patent: Sep. 1, 2020

(54) INFORMATION PROCESSING APPARATUS

(71) Applicant: SONY INTERACTIVE ENTERTAINMENT INC., Tokyo (JP)

(72) Inventors: Tomokazu Kake, Tokyo (JP); Satoshi Nakajima, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/339,773

(22) PCT Filed: Oct. 16, 2017

(86) PCT No.: PCT/JP2017/037382  
§ 371 (c)(1),  
(2) Date: Apr. 5, 2019

(87) PCT Pub. No.: WO2018/074420  
PCT Pub. Date: Apr. 26, 2018

(65) Prior Publication Data  
US 2020/0202627 A1     Jun. 25, 2020

(30) Foreign Application Priority Data

Oct. 21, 2016 (JP) .................................. 2016-206745

(51) Int. Cl.
```
G06T 19/00      (2011.01)
G06T 17/10      (2006.01)
G06T 19/20      (2011.01)
```
(52) U.S. Cl.  
CPC ............ *G06T 19/006* (2013.01); *G06T 17/10* (2013.01); *G06T 19/20* (2013.01); *G06T 2219/2016* (2013.01)

(58) Field of Classification Search  
CPC combination set(s) only.  
See application file for complete search history.

(56) References Cited

U.S. PATENT DOCUMENTS 9,734,616 B1 *  8/2017  Comet .................... G06T 13/40  
2002/0024517 A1 * 2/2002 Yamaguchi ............ A63F 13/10  
345/424

(Continued)

FOREIGN PATENT DOCUMENTS

JP  2009-258058 A  11/2009  
JP  2013-507688 A  3/2013

(Continued)

OTHER PUBLICATIONS

Balan, Voxel Carving and Coloring—Constructing a 3D Model of an Object from 2D Images, Brown University, pp. 1-7 (Year: 2003).*

(Continued)

*Primary Examiner* — Motilewa Good Johnson  
(74) *Attorney, Agent, or Firm* — Katten Muchin Rosenman LLP (57) ABSTRACT

An information processing apparatus that constructs a virtual space by acquiring a plurality of images obtained by observing, at different times, a reality space in which one or more subjects are present, and arranging a plurality of unit volume elements at positions determined depending on a subject captured in each image of the plurality of images.

9 Claims, 5 Drawing Sheets

(56) References Cited

U.S. PATENT DOCUMENTS

| | | | |
|---|---|---|---|
| 2002/0122038 A1* | 9/2002 | Cowperthwaite | G06T 15/40 345/428 |
| 2006/0066611 A1* | 3/2006 | Fujiwara | G06T 15/06 345/419 |
| 2011/0080336 A1* | 4/2011 | Leyvand | G06K 9/469 345/156 |
| 2011/0202538 A1* | 8/2011 | Salemann | G06F 16/29 707/741 |
| 2012/0133656 A1* | 5/2012 | McKenzie | G06T 15/06 345/424 |
| 2012/0275686 A1* | 11/2012 | Wilson | G06K 9/00355 382/154 |
| 2013/0113800 A1* | 5/2013 | McCombe | G06T 15/06 345/424 |
| 2017/0236320 A1* | 8/2017 | Gribetz | G06T 19/00 345/419 |
| 2018/0264365 A1* | 9/2018 | Soederberg | A63F 13/98 |

FOREIGN PATENT DOCUMENTS

| | | |
|---|---|---|
| JP | 2016-103263 A | 6/2016 |
| WO | 2011/044257 A2 | 4/2011 |

OTHER PUBLICATIONS

International Search Report and Written Opinion dated Jan. 16, 2018, from International Application No. PCT/JP2017/037382, 7 sheets.
International Preliminary Report on Patentability dated Apr. 23, 2019, from International Application No. PCT/JP2017/037382, 13 sheets.
Notification of Reason for Refusal dispatched Jan. 14, 2020, from Japanese Patent Application No. 2018-546326, 3 sheets.
Notification of Reason for Refusal dispatched Apr. 14, 2020, from Japanese Patent Application No. 2018-546326, 2 sheets.

* cited by examiner

INFORMATION PROCESSING APPARATUS

TECHNICAL FIELD

The present invention relates to an information processing apparatus, an information processing method and a program that construct a virtual space on the basis of information obtained from a reality space.

BACKGROUND ART

In recent years, researches for techniques about augmented reality and virtual reality have been conducted. One of such techniques is to construct a virtual space on the basis of information obtained from a reality space such as images captured by a camera and give a user an experience as if the user is in the virtual space. Such a technique can give a user such an experience that cannot be experienced in the real world in a virtual space associated with the real world.

In the above-mentioned techniques, objects that are present in the reality space are in some cases expressed by stacking unit volume elements called voxels, point clouds, or the like in the virtual space. By using the unit volume elements, it is possible to reproduce, in the virtual space, various objects that are present in the real world using information obtained from the real world, without preparing information such as colors or shapes of objects in advance.

SUMMARY

Technical Problems

In the above-mentioned technique, methods to reproduce how a reality space that changes over time appears have not been considered sufficiently yet.

The present invention has been made in view of the above-mentioned circumstances, and an object thereof is to provide an information processing apparatus, an information processing method and a program that, can construct a virtual space that reproduces elements in a reality space that changes over time.

Solution to Problems

An information processing apparatus according to the present invention includes an image acquiring unit acquiring an image obtained by observing a reality space in which one or more subjects are present, and a virtual space constructing unit constructing a virtual space to express a subject captured in the acquired image by arranging a plurality of unit volume elements at positions that are determined depending on the subject, in which the image acquiring unit acquires a plurality of images obtained by observing the subject at different times, and the virtual space constructing unit constructs the virtual space on a basis of the plurality of images.

In addition, an information processing method according to the present invention includes an image acquisition step of acquiring an image obtained by observing a reality space in which one or more subjects are present, and a virtual space construction step of constructing a virtual space to express a subject captured in the acquired image by arranging a plurality of unit volume elements at positions that are determined depending on the subject, and in the image acquisition step, a plurality of images obtained by observing the subject at different times are acquired, and in the virtual space construction step, the virtual space is constructed on a basis of the plurality of images.

In addition, a program according to the present invention is for causing a computer to function as an image acquiring unit acquiring an image obtained by observing a reality space in which one or more subjects are present, and a virtual space constructing unit constructing a virtual space to express a subject captured in the acquired image by arranging a plurality of unit volume elements at positions that are determined depending on the subject, in which the image acquiring unit acquires a plurality of images obtained by observing the subject at different times, and the virtual space constructing unit constructs the virtual space on a basis of the plurality of images.

DESCRIPTION OF EMBODIMENTS

Hereinafter, embodiments of the present invention are described in detail on the basis of the drawings.

First Embodiment

Figure 1:
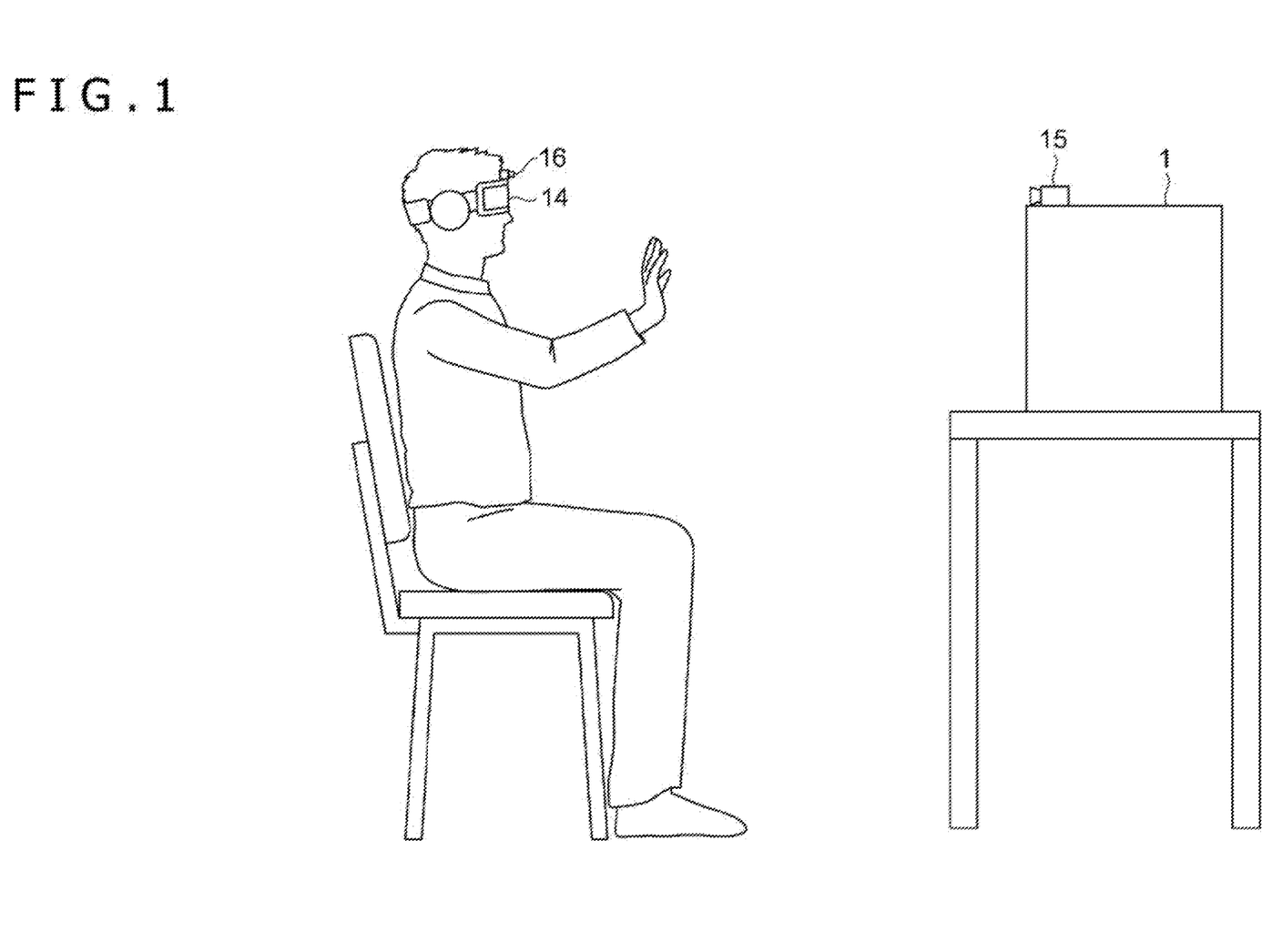
FIG. 1 is a view depicting a state in which a user uses an information processing apparatus according to the first embodiment of the present invention.
Figure 2:
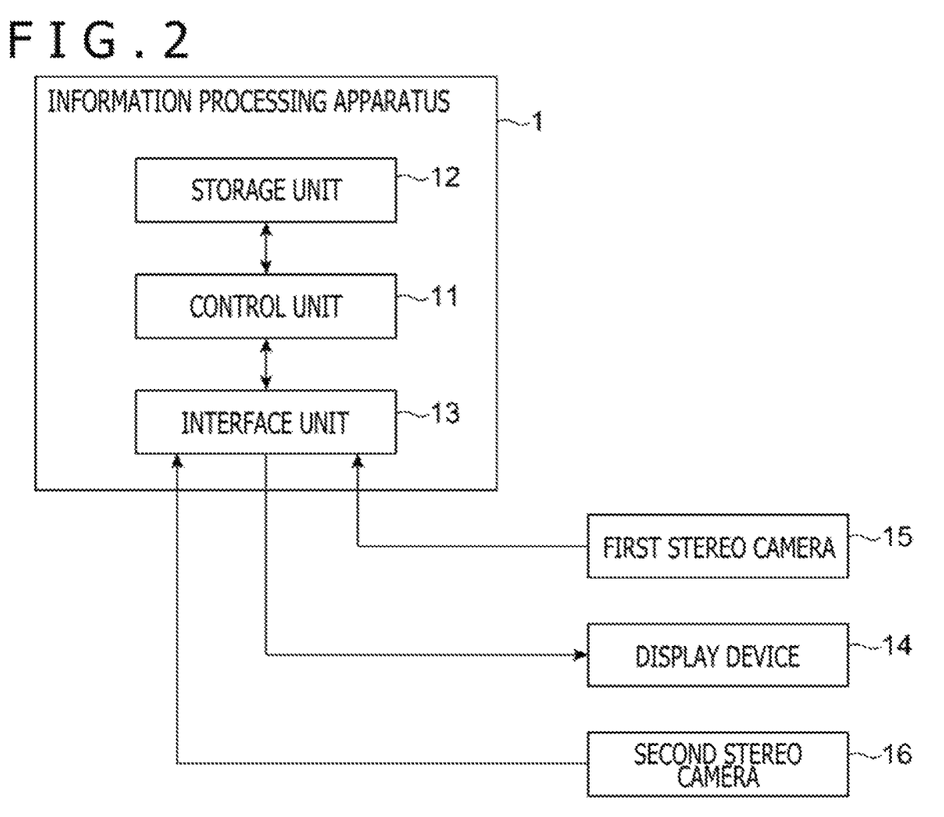
FIG. 2 is a configuration block diagram depicting a configuration of the information processing apparatus according to the first embodiment of the present invention.

FIG. 1 is a view depicting a state in which a user uses an information processing apparatus 1 according to the first embodiment of the present invention. In addition, FIG. 2 is a configuration block diagram depicting a configuration of the information processing apparatus 1. The information processing apparatus 1 is a home game machine, a portable game machine, a personal computer, a smartphone, or the like, for example, and includes a control unit 11, a storage unit 12, and an interface unit 13, as depicted in FIG. 2. In addition, the information processing apparatus 1 is connected with a display device 14, a first stereo camera 15, and a second stereo camera 16 as depicted in FIG. 2.

The control unit 11 includes at least one processor, and executes various types of information processing by executing a program stored in the storage unit 12. Specific examples of processes to be executed by the control unit 11 in the present embodiment are mentioned below. The storage unit 12 includes at least one memory device such as a RAM, and stores therein a program to be executed by the control unit 11 and data to be processed by the program. The interface unit 13 is an interface for the information processing apparatus 1 to exchange various types of information with the display device 14, the first stereo camera 15, and the second stereo camera 16.

The display device 14 displays video images depending on video signals supplied from the information processing apparatus 1. In the present embodiment, the display device 14 is assumed to be a display device of a type to be worn on a head such as a head-mounted display to be used by being worn on the head of a user. The display device 14 is assumed to cause the user to view a left eye image and a right eye image that are different from each other with left and right eyes of the user. Accordingly, the display device 14 can display stereoscopic video images utilizing a parallax.

The first stereo camera 15 is constituted by a plurality of cameras arranged in line from side to side, and is used for observing a reality space in which one or more subjects are present. By utilizing a parallax between images captured by the plurality of cameras, the information processing apparatus 1 can calculate a distance from, the image-capturing position of the first stereo camera 15 (observation point) to a subject captured in the captured images. A captured image captured by each camera constituting the first stereo camera 15 is input to the information processing apparatus 1 via the interface unit 13. Likewise, the second stereo camera 16 is also constituted by a plurality of cameras that are arranged in line from side to side, and is used for calculation of a distance to a subject in its viewing range.

In the present embodiment, the first stereo camera 15 is installed in front of a user, and its position and orientation are fixed so as to face the user. On the other hand, the second stereo camera 16 is attached to the display device 14, and its image-capturing direction is oriented toward the forward direction of the display device 14. That is, the observation point of the first stereo camera 15 is fixed in the reality space. In contrast, the observation point of the second stereo camera 16 is fixed relative to the user, and is to move along with motion of the head of the user. In a normal use state, the first stereo camera 15 faces the second stereo camera 16, and the viewing range of the first stereo camera 15 includes the head of the user, the display device 14 and the second stereo camera 16. In addition, when the user faces the forward direction, the viewing range of the second stereo camera 16 includes the first stereo camera 15.

Note that it is assumed here that the second stereo camera 16 is a distinct device attached to the display device 14, but the second stereo camera 16 may be configured integrally with the display device 14. In addition, the first stereo camera 15 may be configured integrally with the information processing apparatus 1.

Figure 3:
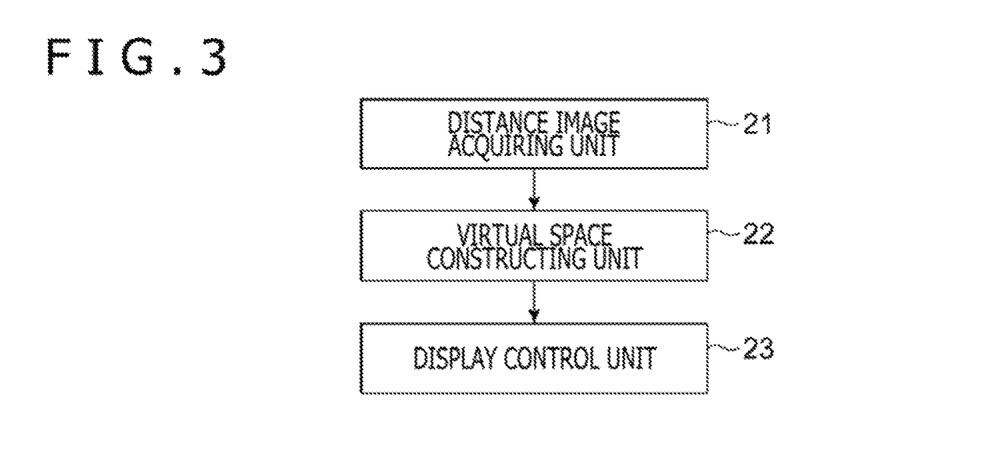
FIG. 3 is a function block diagram depicting functions of the information processing apparatus according to the first embodiment of the present invention.

Hereinafter, functions to be realized by the information processing apparatus 1 are described with reference to FIG. 3. As depicted in FIG. 3, in terms of functions, the information processing apparatus 1 includes a distance image acquiring unit 21, a virtual space constructing unit 22, and a display control unit 23. These functions are realized by the control unit 11 operating in accordance with a program stored in the storage unit 12. The program may be provided to the information processing apparatus 1 via a communication network such as the Internet, or may be provided as a program stored in a computer-readable information storage medium such as an optical disk.

The distance image acquiring unit 21 acquires distance images (depth map) obtained by capturing images in a reality space by each of the first stereo camera 15 and the second stereo camera 16. Hereinafter, a distance image generated on the basis of an image captured by the first stereo camera 15 is denoted as a first distance image DM1, and a distance image generated on the basis of an image captured by the second stereo camera 16 is denoted as a second distance image DM2. In addition, these two types of distance images are collectively referred to as distance images DM. In the present embodiment, a distance image DM is an image including information of a distance D to a portion of an object (subject portion) captured at least, in the unit area for each of a plurality of unit areas in the image. Here, a unit area may be each single pixel in an image, or may be a pixel block including a plurality of adjacent, pixels. The distance image DM may include color component information of a subject captured in a unit area.

In addition, the distance image acquiring unit 21 acquires, together with a distance image DM, information regarding the position and the orientation of a stereo camera at a time point at which an image used to generate the distance image DM is captured. Hereinafter, the information regarding the position and the orientation of the stereo camera when an image used to generate the distance image DM is captured is referred to as observation point information. In particular, the position and the orientation of the second stereo camera 16 changes along with motion of the head of the user. Accordingly, corresponding observation point information is required to specify the position in the reality space of an object captured in the second distance image DM2. Using data of a distance image DM and the observation point information of images used to generate the distance image DM, it is possible to specify the position in the reality space of a subject captured in each unit area in the distance image DM.

Specifically, for example, the distance image acquiring unit 21 may specify the position and the orientation of the second stereo camera 16 captured in an image captured by the first stereo camera 15 to thereby specify the position and the orientation in the reality space of the second stereo camera 16. In this case, a light emitting element may be attached to a predetermined position of the second stereo camera 16 or the display device 14, and this light emitting element may be caused to emit light in order to specify the position of the second stereo camera 16 with high precision. In this way, the distance image acquiring unit 21 can specify the position at which light from the light emitting element is captured in an image captured by the first stereo camera 15 to thereby specify observation point information of the second stereo camera 16. In addition, by arranging a plurality of light emitting elements in the second stereo camera 16 or the display device 14 and detecting a positional pattern of the light, changes in inclination of the second stereo camera 16 as seen from the first stereo camera 15 can be also specified.

In addition, the distance image acquiring unit 21 may use a result of detection by a motion sensor included in the second stereo camera 16 or the display device 14 to specify changes of the position and the orientation of the second stereo camera 16. Specifically, by utilizing a result of detection by a motion sensor such as an acceleration sensor, a gyro scope, or a geomagnetic sensor built in the second stereo camera 16 or the display device 14, the distance image acquiring unit 21 can specify observation point information of the second stereo camera 16.

In addition, the distance image acquiring unit 21 may use temporal changes in images captured by the second stereo camera 16 to specify changes of the position and the orientation of the second stereo camera 16. Such positional estimation based on temporal changes in captured images can be realized by known stereo SLAM (Simultaneous Localization and Mapping) techniques and the like. By keeping monitoring changes of the position and the orientation of the second stereo camera 16 using such techniques, it is possible to specify observation point information of the second stereo camera 16 at any time point using, as a reference, the position and the orientation of the second stereo camera 16 at the time point at which monitoring is started. According to this method, observation point information can be specified only from images captured by the second stereo camera 16, even without, devices such as a light emitting element or a motion sensor.

Note that the distance image acquiring unit 21 may use, in combination, a plurality of the methods for specifying observation point information that have been described above. Accordingly, observation point information can be specified more precisely. In addition, observation point information may be specified by a method other than those described above.

The virtual space constructing unit 22 constructs a virtual space on the basis of a first distance image DM1 and a second distance image DM2 acquired by the distance image acquiring unit 21. Specifically, the virtual space constructing unit 22 generates a plurality of voxels expressing each of one or more subjects (that is, objects that are present in the reality space) captured in each distance image DM and arranges these subjects in a virtual three-dimensional space to thereby reproduce those subjects in the virtual space. In this case, a voxel is a unit volume element to be associated with each of grid squares obtained by dividing a three-dimensional space into a grid. For example, a voxel may be an object having a cubic shape with a predetermined size. Furthermore, in the present embodiment, the virtual space constructing unit 22 is assumed to arrange multiple types of voxels with different properties in a virtual space. A specific example of processes of generating multiple types of voxels is described later. Objects with various shapes that are present in the reality space are expressed in the virtual space by a set of a plurality of voxels.

Specifically, the virtual space constructing unit 22 generates voxels corresponding to each of unit areas included in the first distance image DM1 and the second distance image DM2 acquired by the distance image acquiring unit 21 and arranges them in the virtual space.

A position where a voxel is arranged is determined on the basis of the distance D from a stereo camera to an object captured in a corresponding unit area, the position of the unit area in a distance image DM, and observation point information of the stereo camera. In addition, a surface color of the voxel may be determined on the basis of a color (pixel value) of the corresponding unit area. In principle, the surface of each voxel is expressed with a single solid color.

The second distance image DM2 includes a background seen from a position close to the point of view of the user. Accordingly, voxels generated on the basis of the second distance image DM2 are deemed to correspond to objects present around the user, such as a wall, a floor, or a furniture in a room where the user is present. In other words, by generating and arranging voxels on the basis of the second distance image DM2, the virtual space constructing unit 22 can reproduce, in a virtual space, a state of the room where the user is present. Note that the distance image acquiring unit 21 may acquire the second distance images DM2 multiple times, and the virtual space constructing unit 22 may generate voxels on the basis of each of the plurality of second distance images DM2. The user is caused to look around in a state in which the user is wearing the display device 14 to which the second stereo camera 16 is attached, and voxels are arranged using a plurality of second distance images DM2 generated on the basis of a plurality of captured images that are captured during the motion of the user. Accordingly, the virtual space constructing unit 22 can reproduce how the reality space appears over a wider range than the viewing angle of the second stereo camera 16.

On the other hand, it is presumed that the user is captured in the first distance image DM1. Accordingly, voxels generated on the basis of the first distance image DM1 reproduce the body of the user. By arranging voxels generated on the basis of two distance images DM in one virtual space, the virtual space constructing unit 22 can construct a virtual space reproducing both the user and the space around the user. Note that, when arranging voxels on the basis of the first distance image DM1, the virtual space constructing unit 22 may treat, as a processing target, only a subject portion that is present in a predetermined range centered on the position where the second stereo camera 16 is present in the reality space. This is because subjects that are present at positions apart from the second stereo camera 16 are deemed not to be the user. Conversely, when arranging voxels based on the second distance image DM2, the virtual space constructing unit 22 may treat, as a processing target, only a subject portion that is present outside a predetermined range centered on the position where the second stereo camera 16 is present in the reality space.

The display control unit 23 generates a spatial image to represent how the inside of the virtual, space constructed by the virtual space constructing unit 22 appears, and causes the display device 14 to display the generated spatial image. For example, the display control unit 23 arranges the point of view at a position in the virtual space corresponding to the current position of the display device 14 in the reality space, and generates a spatial image to represent how the inside of the virtual space appears when seen from the point of view. At this time, the display control unit 23 arranges two points of view corresponding to the left and right eyes of the user in line in the virtual space, and generates two spatial images each representing how the inside of the virtual space appears when seen from a corresponding one of those two points of view. By causing the display device 14 to display those two spatial images as a left eye image and a right eye image, the user can stereoscopically recognize how the inside of the virtual space appears.

In this case, the display control unit 23 uses observation point information of the second stereo camera 16 to specify the position and the line-of-sight direction of the eyes of the user. Then, the display control unit 23 sets the point of view for drawing a spatial image to the position and the orientation in a virtual space corresponding to the position and the orientation of the eyes of the user. Accordingly, it is possible to cause the display device 14 to display a state in which the user sees an object in the virtual space in the same manner as how the user sees the reality space.

In addition, the display control unit 23 may set the point of view to a position different from the actual position of the eyes of the user. For example, the display control unit 23 may move the position of the point of view in the virtual space depending on an instruction about directions to a manipulation device from the user. Accordingly, the user can view a state of a space where the user is present including the body of the user from any position in a space apart from the body of the user.

Hereinafter, a specific example of processes in which the virtual space constructing unit 22 arranges multiple types of voxels in a virtual space is described. First, multiple examples in which the virtual space constructing unit 22 arranges multiple types of voxels with different sizes in a virtual space are described as first to sixth examples. In these examples, voxels with different sizes are mixedly present in a virtual space in the same period. In the following example, for convenience of explanation, a case in which subjects captured in the second distance image DM2 are reproduced by multiple types of voxels is described by way of example. However, this is not the sole example, and the virtual space constructing unit 22 may execute a similar process also when reproducing subjects captured in the first distance image DM1.

As the first example, an example in which the sizes of voxels to constitute subjects captured in the second distance image DM2 are changed depending on the size of each subject is described. In this first example, the virtual space constructing unit 22 first specifies the size of each subject captured in the second distance image DM2. Specifically, the virtual space constructing unit 22 uses an estimator prepared in advance to identify individual subjects captured in the second distance image DM2. This estimator can be generated by a known machine-learning technique, for example. If each subject can be distinguished from other subjects by this estimation, the size of an area occupied by each subject in the second distance image DM2 can be specified. By using the size of a subject in the second distance image DM2 and information about a distance D to the subject, the actual size of each subject can be specified.

After specifying the size of each subject, the virtual space constructing unit 22 next specifies the sizes of voxels for reproducing the subject depending on the size specified. For example, the virtual space constructing unit 22 increases the sizes of voxels to constitute a subject as the size of the subject increases. In this manner, a subject having a large size can be reproduced using a relatively small number of voxels.

Figure 4:
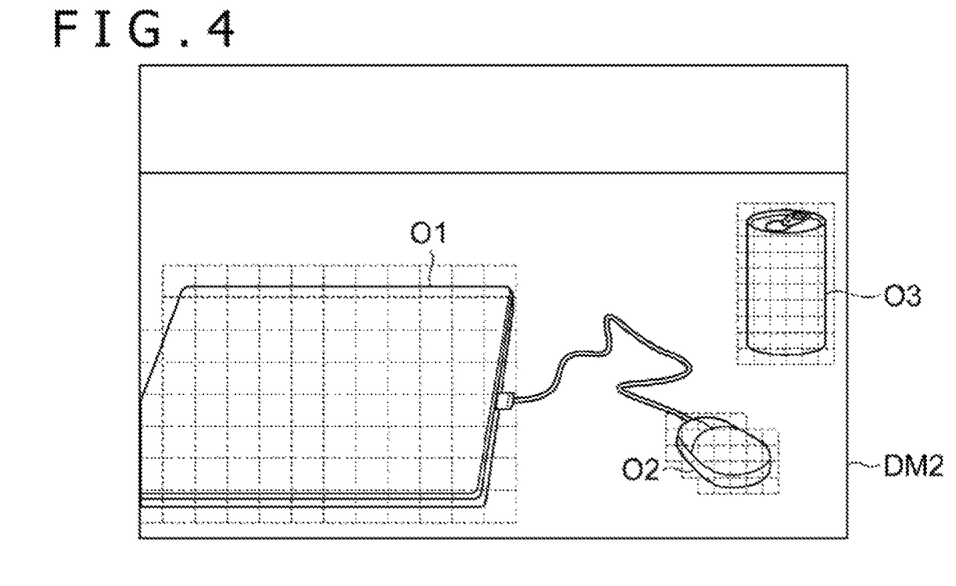
FIG. 4 is a view for explaining a first example of arranging multiple types of voxels in a virtual space.

FIG. 4 depicts one example of the second distance image DM2 in this example. In the example of this figure, three subjects O1 to O3 captured in a second distance image DM2 are identified, and sizes of voxels to constitute each of them are determined depending on sizes of the subjects. In this example of this figure, the virtual space constructing unit 22 determines the sizes of the voxels to constitute the subject O1 to be larger than the voxels to constitute the other subjects O2 and O3.

Correspondingly, the unit area of the range occupied by the subject O1 in the second distance image DM2 is set to be larger than the unit areas of the ranges occupied by the subjects O2 and O3, and voxels are arranged in the virtual space so as to correspond to each of those unit areas. Accordingly, the voxels to constitute the subject O1 can be made larger than the voxels to constitute the subjects O2 and O3, and correspondingly, distances between the individual pixels can also be increased.

As the second example, an example in which sizes of voxels to constitute subjects are changed depending on a shape or an appearance of each subject is described. In this second example also, similarly to the first example, the virtual space constructing unit 22 first uses an estimator to identify each of subjects captured in the second distance image DM2. Then, the virtual space constructing unit 22 specifies the shapes of the individual subjects depending on results of the identification.

Specifically, for example, the virtual space constructing unit 22 uses a value of a distance D of each of a plurality of unit areas constituting the individual subjects to specify a degree of unevenness of the surface of the subject. Then, the virtual space constructing unit 22 reduces the sizes of the voxels to constitute a subject as the degree of unevenness of the subject increases, and increases the sizes of the voxels to constitute a subject as the degree of unevenness of the subject decreases. If the degree of unevenness is high, the unevenness can be reproduced by using small voxels. Conversely, if the degree of unevenness is low, the shape can be reproduced at a certain level of precision even if relatively large voxels are used.

In addition, the virtual space constructing unit 22 decides whether or not individual subjects are predetermined particular objects on the basis of information regarding the shape or the appearance of each subject captured in the second distance image DM2, and if it is decided that a subject is a particular object, the sizes of the voxels to constitute the object may be increased. The decision about whether or not each subject is a particular object can be realized using an estimator generated by machine-leaning or the like, similarly to the above-mentioned process of identifying subjects. In addition, it may be decided whether or not the subject has a particular shape, whether or not the subject has a particular color, whether or not the subject includes a particular mark, and so on by executing an image recognition process on the second distance image DM2, and it may be decided whether or not the subject is a particular object on the basis of a result of the decision.

If the sizes of the voxels are made larger than a certain degree, the shape of the object becomes coarse, and it becomes difficult for a user to grasp the shape or appearance in detail as if the object looks pixelated. In view of this, if it is decided that a particular object is captured in the second distance image DM2, details of the object in a spatial image can be hidden by setting the sizes of the voxels to express the object to sizes which are equal to or larger than a predetermined value. Accordingly, this enables an object which is unfavorable to be displayed (for example, objects which cannot be displayed due to issues on the rights) to be in a state in which the user hardly recognizes.

As the third example, an example in which the sizes of the voxels to constitute each subject are changed depending on the distances between the subject and other individual subjects is described. Also in this example, similarly to the first and the second examples, the virtual space constructing unit 22 first identifies the individual subjects in a second distance image DM2. Then, the virtual space constructing unit 22 calculates the distances in the reality space from the individual subjects to other subjects on the basis of positional information of each subject, and determines the sizes of the voxels to constitute each subject depending on the calculated distances. For example, the virtual space constructing unit 22 reduces the sizes of the voxels for a subject whose distances to other subjects are calculated to be short, and conversely, increases the sizes of the voxels for a subject whose distances to other subjects are calculated to be long. Accordingly, it becomes possible to reduce the sizes of the voxels to constitute the individual subjects in a place where things are densely located, and increase the sizes of the voxels to constitute the individual objects in a place where things are sparsely located.

As the fourth example, an example in which the sizes of the voxels to constitute each subject are changed depending on the position in the reality space of the subject is described. In this fourth example, the distance from a position in the reality space corresponding to the point-of-view position set by the display control unit 23 to each subject is calculated. Then, the sizes of the voxels to constitute the subject are determined depending on the calculated distance. Specifically, the virtual space constructing unit 22 reduces the sizes of the voxels to constitute an object which is present at a place close to the point-of-view position, and increases the sizes of the voxels to constitute an object which is present at a place far from the point-of-view position. Accordingly, an object which is present in front in the spatial image is displayed such that its appearance can be seen in detail, and an object which is present far from a user is displayed coarsely.

As the fifth example, an example in which a position to which a user is paying attention (gazing point) is specified in a virtual space, and the sizes of the voxels to be arranged around the specified gazing point are reduced is described. In this example, first, the virtual space constructing unit 22 specifies the line-of-sight direction of the user. The line-of-sight direction of the user can be specified, for example, by capturing the eyes of the user with a camera provided to the display device 14 and analyzing the positions of the pupils. Alternatively, the virtual space constructing unit 22 may assume that the user is gazing at the center of the spatial image. In either way, the virtual space constructing unit 22 specifies, as the gazing point of the user, a position in a virtual space where an object displayed in the line-of-sight direction of the user is present. Then, the virtual space constructing unit 22 uses small voxels to express an object which is present at the gazing point and objects which are present at positions close to the gazing point, and uses large voxels to express objects which are present at positions apart from the gazing point.

Figure 5:
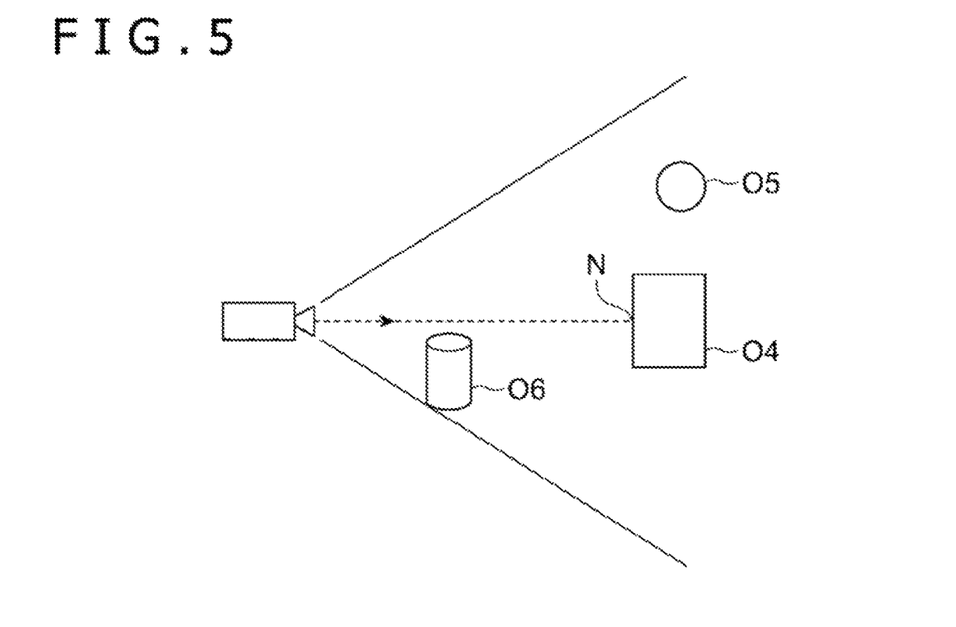
FIG. 5 is a view for explaining a fifth example of arranging multiple types of voxels in a virtual space.

FIG. 5 is a view for explaining a positional relationship between the gazing point and objects in this example, and illustrates how a reality space appears when it is seen from above. In the example of this figure, it is assumed that three subjects O4 to O6 are present, in the reality space, and the user is gazing at the center of the spatial image. A straight line (broken line in the figure) extending in the front direction from the point-of-view position reaches the subject O4 at the point N. Accordingly, it is presumed that the gazing point is the point N, and the user is paying attention to the subject O4. Then, the virtual space constructing unit 22 makes the sizes of the voxels to constitute the subject O4 the smallest, and the sizes of the voxels are increased in the order of the subject O5 and the subject O6 corresponding to the ascending order of distances to the subject O4.

Note that, although the sizes of the voxels are determined depending on distances between the subjects and the gazing point in the virtual space in this case, the sizes of the voxels may be determined depending on distances between the subjects and the gazing point in the spatial image. In this case, the virtual space constructing unit 22 reduces the sizes of the voxels as the distances from positions at which the voxels are displayed to the gazing point in the spatial image decrease.

As the sixth example, an example in which the sizes of the voxels to constitute each subject are changed depending on a moving speed of the subject in the reality space is described. The distance image acquiring unit 21 acquires second distance images DM2 depicting how the reality space appears at time points at certain time intervals. Then, the virtual space constructing unit 22 specifies a subject that is moving over time by identifying individual subjects in the second distance images DM2. For example, if two second distance images DM2, a second distance image DM2($t$) at a clock time t, and a second distance image DM2($t+\Delta t$) at a clock time (t+$\Delta$t), are acquired, and a position of a subject X specified in the second distance image DM2($t$) and a position of the same subject X specified in the second distance image DM2($t+\Delta t$) are separated by a distance d, it can be estimated that the object X is moving at a speed (d/$\Delta$t). Using this estimation result, the virtual space constructing unit 22, for example, uses large voxels to express a subject moving at a high speed, and uses small voxels to express a subject moving at a low speed (or a still subject). Accordingly, it is possible to display in detail an object that is moving slowly and that a user can easily recognize visually, and only generally display an object which is moving slowly.

In any of the first to the sixth examples described above, the virtual space constructing unit 22 identifies the individual subjects captured in the second distance image DM2 and, for each of the subjects, determines the sizes of the voxels to constitute the subject. However, the virtual space constructing unit 22 is not limited to such examples, and may change the sizes of the individual voxels depending on arrangement positions of the voxels or the like. For example, although the sizes of the voxels are changed depending on its position for each of the subjects in the above-mentioned fourth example, this is not the sole example, and for an individual voxel, the size may be changed depending on the distance from the point-of-view position. In addition, in the above-mentioned fifth example, the virtual space constructing unit 22 may determine the size of each voxel depending on the distance of each voxel to be arranged in the virtual space from the gazing point.

In addition, the virtual space constructing unit 22 may divide the virtual space into a plurality of areas, and change the sizes of the voxels for each of the areas. For example, in the fourth example, the sizes of voxels to be arranged in each area are determined depending on the distance from the point-of-view position to the area. In addition, in the fifth example, the sizes of the voxels to be arranged in each area may be determined depending on the distance from the gazing point to the area. In addition, the sizes of voxels to be arranged in each area may be determined depending on the number of subjects to be arranged in the area. Accordingly, similarly to the third example, it becomes possible to reduce the sizes of the voxels in a place where the subjects are densely located, and increase the sizes of the voxels in a place where the subjects are sparsely located.

Next, a plurality of distance images DM each acquired at different timing are used to illustrate how a virtual space that changes over time appears. In the following example, the distance image acquiring unit 21 acquires distance images DM obtained by observing the reality space at time points at predetermined time intervals. Then, the virtual space constructing unit 22 is assumed to construct a virtual space reproducing subjects captured in the distance images DM on the basis of the distance images DM obtained at the predetermined time intervals.

As a seventh example, an example in which the sizes of voxels are changed over time is described. In this example, every time new second distance images DM2 are acquired at predetermined time intervals, the virtual space constructing unit 22 arranges voxels to represent subjects captured in the newly acquired second distance images DM2 on the basis of the second distance images DM2. At this time, the virtual space constructing unit 22 determines the sizes of the voxels depending on a duration during which ranges captured in the newly acquired second distance images DM2 are continuously observed. Specifically, if the user keeps the orientation of the second stereo camera 16 the same and keeps observing the same area in the reality space, the virtual space constructing unit 22 gradually reduces the sizes of the voxels to represent subjects included in the area. Conversely, if a new area is included in an image capturing range of the second distance image DM2 as a result of the user moving the head and changing the image capturing range of the second stereo camera 16, the sizes of the voxels to represent subjects included in the area are increased. With such a manner of control, it becomes possible to first display roughly how the reality space appears, and display in detail how subjects in the place appear after the same place is kept being displayed for a while, thereby realizing a process on the voxels with a small amount of data for a place which is displayed only for a very short time.

As an eighth example, an example in which voxels are arranged on the basis of first distance images DM1 acquired in the past. Different from previous examples, in this eighth example, the virtual space constructing unit 22 is assumed to arrange the voxels in the virtual space on the basis of first distance images DM1. Since it is presumed that the user is captured in the first distance images DM1, this results in the virtual space constructing unit 22 generating voxels to mainly express the user. However, this is not the sole example, and the virtual, space constructing unit 22 may execute a process described below using the second distance images DM2.

In this example, on the basis of the first distance image DM1 acquired by the distance image acquiring unit 21 at timing of a clock time t, the virtual space constructing unit 22 arranges voxels in a virtual space at timing at which a clock time (t+tp), which is a predetermined length of time after the clock time t, has come. This means that the voxels represent how a subject (particularly, the user in this case) appeared in the past which is the time tp before the current time. By the display control unit 23 displaying how the inside of the virtual space appears, the user can view how the user appeared in the past. In addition, the user can interact with the user by touching voxels representing the user in the past in the virtual space.

Furthermore, in this example, the virtual space constructing unit 22 may arrange voxels representing states of a single subject at different timing on the basis of a plurality of first distance images DM1 each acquired at different timing. Specifically, for example, the virtual space constructing unit 22 arranges a first voxel group G1 at a position determined on the basis of a first distance image DM1 obtained at a clock time t1, and additionally arranges a second voxel group G2 on the basis of a first distance image DM1 obtained at a clock time t2. The first voxel group G1 represents how the user appears at the clock time t1, and the second voxel group G2 represents how the user appears at the clock time t2. By arranging these voxel groups in the same period in a single virtual space, it is possible to express a state as if a single user is present at multiple locations in the same period.

Furthermore, if voxels depicting how a subject appeared in the past are arranged in a virtual space in this manner, properties of each voxel may be changed depending on a time at which a first distance image DM1 corresponding to the voxel is obtained. Specifically, for example, the virtual space constructing unit 22 changes sizes of voxels to be arranged in a virtual space on the basis of a first distance image DM1 depending on a time at which the first distance image DM1 is obtained. In particular, by reducing the sizes of the voxels to represent the subject captured in the first distance image DM1 as the length of time that passes since the first distance image DM1 is obtained increases, the degree of detailedness in reproducing the subject can be increased as the subject becomes older.

The various types of examples of methods of arranging voxels described above may be used in combination. For example, the virtual space constructing unit 22 may change the sizes of the voxels to be arranged on the basis of past distance images DM under various types of conditions for each subject. In addition, the virtual space constructing unit 22 may determine the sizes of the voxels to constitute each subject on the basis of multiple conditions such as the position or the size of the subject.

Second Embodiment

Figure 6:
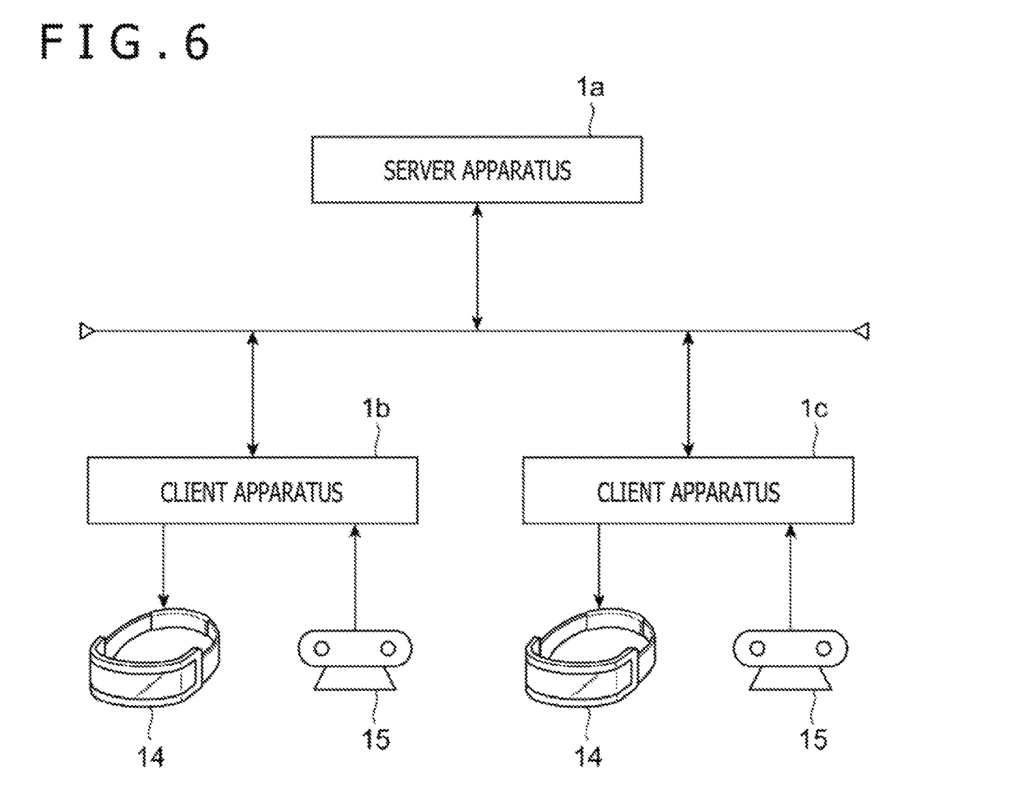
FIG. 6 is a configuration block diagram depicting a configuration of an information processing apparatus according to the second embodiment, of the present invention.

As a second embodiment of the present invention, an example in which a virtual space is constructed on the basis of distance images DM obtained by observing multiple users is described. In this example, as depicted in FIG. 6, functions of the information processing apparatus 1 according to the first embodiment mentioned above are realized by a server apparatus 1a and client apparatuses 1b and 1c.

The server apparatus 1a is a server computer or the like, and is connected with the client apparatuses 1b and 1c through a communication network. The client apparatuses 1b and 1c are each an information processing apparatus such as a home game machine, a portable game machine, a personal computer, or a smartphone, and are connected with the display device 14 and first stereo camera 15. In the following description, it is assumed that a user U1 uses the client apparatus 1b, and a user U2 uses the client apparatus 1c.

Similarly to the first embodiment, the display device 14 is assumed to be a display device of a type to be worn on the head of the user. In addition, similarly to the first embodiment, the first stereo camera 15 is a stereo camera for capturing images necessary for generating distance images DM, and is fixedly arranged at a position to capture the user. Note that, although a description is omitted here, the second stereo camera 16 is also connected in a similar manner to that in the first embodiment, and may be utilized for generation of distance images DM and construction of a virtual space.

Note that, although it is assumed here that two users each use one client apparatus, the number of client apparatuses to be utilized by each user may be two or more. In this case, for example, a process of generating distance images DM using images captured by the first stereo camera 15 or a process of causing the display device 14 to display a spatial image may be executed by a plurality of client apparatuses independently. In addition, although it is assumed here that two users are observation targets, observation targets may be three people or more, and three client apparatuses or more may be connected to the server apparatus 1a simultaneously.

In the present embodiment, each client apparatus uses images captured by the first stereo camera 15 connected to the client apparatus to generate a first distance image DM1, and transmits the generated first, distance image DM1 to the server apparatus 1a. The server apparatus 1a acquires the first distance image DM1 transmitted from each of the client apparatuses 1b and 1c, and on the basis of a plurality of the first distance images DM1 acquired, arranges voxels to reproduce subjects captured in the individual first distance images DM1. In other words, in the present embodiment, the server apparatus 1a realizes the functions of the distance image acquiring unit 21 and the virtual space constructing unit 22 described above. The server apparatus 1a transmits, to each of the client apparatuses 1b and 1c, information indicating the position of each of the voxels arranged in the virtual space and properties of the individual voxels. Each client apparatus uses voxel information received from the server apparatus 1a to draw a spatial image to represent how the inside of the virtual space appears, and displays the spatial image on the display device 14 connected to the client apparatus. Accordingly, each user can view how the inside of the virtual space in which the voxels to express both the user and other users at positions that are far from the user are arranged appears.

In the present embodiment, when arranging the voxels on the basis of the first distance images DM1 acquired from each client apparatus, the virtual space constructing unit 22 of the server apparatus 1a may change the sizes of the voxels to be arranged depending on various types of conditions, similarly to the case of the above-mentioned first embodiment. In addition, the voxels may be arranged on the basis of first distance images DM1 acquired at certain timing in the past.

Hereinafter, a specific example in the present embodiment is described regarding a process to be executed by the virtual space constructing unit 22 when arranging the voxels to represent multiple users in the virtual space.

Figure 7:
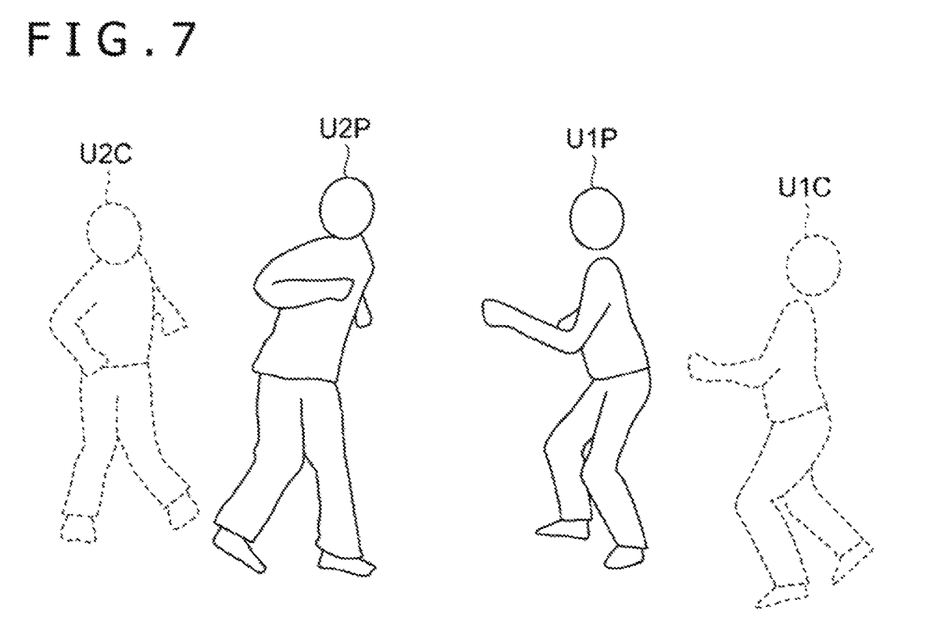
FIG. 7 is a view depicting an example of a virtual space in which voxels are arranged, the voxels depicting how multiple users appear at different timings.

As a first example, similarly to the eighth example in the first embodiment, the virtual space constructing unit 22 may arrange the voxels representing how each user appears at different timing. FIG. 7 depicts how this situation appears, and a voxel group U1C representing how the user U1 appears currently, a voxel group U1P representing how the user U1 appeared in the past, a voxel group U2C representing how the user 112 appears currently, and a voxel group U2P representing how the user U2 appeared in the past are arranged in a virtual space simultaneously. With such a manner of control, it is possible to express such a state that one user is present at multiple locations in the virtual space simultaneously, that one user moves to a position at which the user overlaps with the user in the past, and the like, and complicated actions which may not be achieved by one person in the reality space become possible. In addition, the virtual space constructing unit 22 may replace only some voxel groups among voxel groups representing the body of one user with voxel groups representing the body of the user in the past. For example, the left half of the body may be constituted by voxel groups representing how the left half of the body appears currently, and the right half of the body may be constituted by voxel groups representing how the right half of the body appeared in the past, and the like.

Furthermore, in this example, the virtual space constructing unit 22 may make properties of voxels different between voxel groups representing how a subject appears currently and voxel groups representing how the subject appeared in the past. Specifically, for example, the virtual space constructing unit 22 is assumed to display the voxel groups using high transparency for the voxel groups representing how the subject appears currently and low transparency for the voxel groups representing how the subject appeared in the past. In this manner, each user can clearly recognize the state of a partner user in the past, but it becomes more difficult to recognize the current state. Accordingly, in a case in which both the users engage in a game in a virtual space or in other cases, information about the partner user presented to each user can effectively be restricted. In addition, instead of changing transparency, the virtual space constructing unit 22 may change the sizes of the voxels. As mentioned above, by increasing the sizes of the voxels to constitute the user, it becomes more difficult to distinguish the posture or the like of the user in detail, so that information to be conveyed to the partner user can be restricted.

As a second example, the virtual space constructing unit 22 may change properties of voxels depending on positions in a virtual space. For example, in a case in which users engage in a game in which each user has his/her own position in a virtual space, and makes an attack on a position of an opponent, the transparency is made high when each user is in his/her own position, and the transparency is made low when the user enters the position of the opponent. Accordingly, each user can keep an opponent from knowing how the user appears while the user is in his/her position, but when the user enters the position of the opponent, the opponent gets to recognize the entrance. Also in this second example, the sizes of the voxels to constitute the users may be changed instead of transparency. In addition, the virtual space constructing unit 22 may change the properties of the voxels depending on distances between the users. Accordingly, control can be realized so as to allow a user, to visually recognize an opponent user when the user approaches the opponent user, and so on.

As a third example, the virtual space constructing unit 22 may change properties of voxels depending on moving speeds of users. Moving speeds in this case can be specified in a similar manner to that in the above-mentioned sixth example in the first embodiment. For example, a user moving at a high moving speed is expressed with less transparent voxels, and a user moving at a low moving speed or not moving is expressed with highly transparent voxels. Accordingly, when a user does not move, the situation is not known by an opponent, but when the user moves, the situation is known by the opponent. Also in this third example, the sizes of the voxels to constitute users may be changed instead of transparency.

Although the transparency and/or the sizes of the voxels are changed under various types of conditions in the foregoing description, this is not the sole example, and the virtual space constructing unit 22 may change the colors or the shapes of the voxels, or other parameters depending on positions or moving speeds of the voxels, times at which corresponding subjects are observed, and so on. In the following, an example in which parameters representing position keeping forces are set for individual voxels is described.

Figure 8:
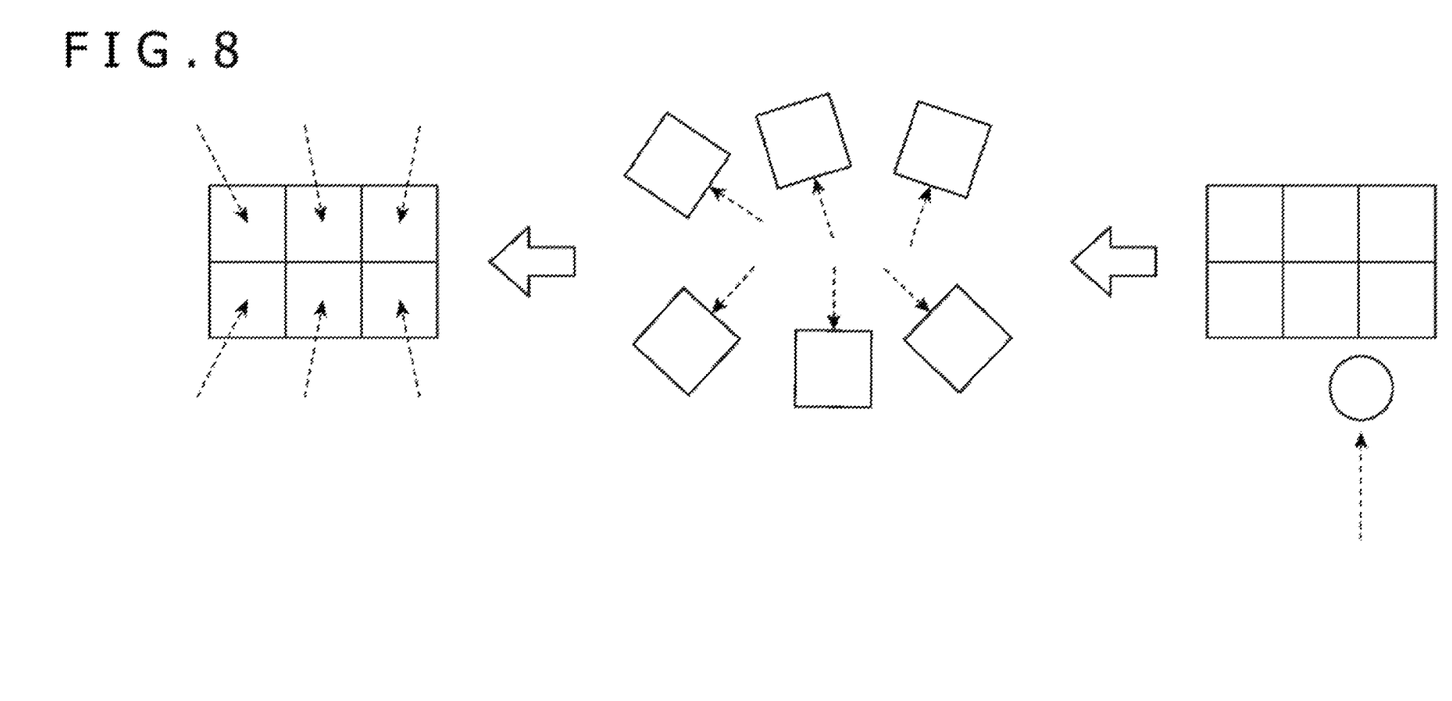
FIG. 8 is a view for explaining behaviors of voxels for which parameters of position keeping forces are set.

In this example, the virtual space constructing unit 22 sets a value of a parameter representing a position keeping force for each voxel arranged in a virtual space. This parameter of the position keeping force indicates whether or not the voxel can easily change its position from a position determined on the basis of a distance image DM. When the position keeping force is high, it becomes more difficult for each voxel to shift from a position determined on the basis of a distance image DM. In addition, even if the position of a voxel is shifted upon application of an external force in the case of collision with another object arranged in the virtual space, and other cases, the position of the voxel restores its original position quickly. Accordingly, the shape represented by a set of voxels do not change largely as compared to the shape of a real subject. In contrast to this, when the position keeping force is low, the position of each voxel easily varies upon application of the external force in the virtual space. Accordingly, the shape represented by the set of voxels can easily change from the shape of the real subject. In other words, the shape of an object easily gets out of shape. FIG. 8 depicts how an object constituted by a plurality of voxels appears when the object is deformed due to an external force and then, how the object restores its original shape by its position keeping force.

It is assumed that the parameter of the position keeping force is represented by a numerical value in the range of 0.0 to 1.0, for example. In this case, 1.0 represents that the position of a voxel does not change at all, and 0.0 represents that the voxel changes its position upon receiving an external force and does not return to its original position. In addition, the parameter of the position keeping force may represent, the strength of connection (connecting force) with surrounding voxels, for example. In addition, the parameter of the position keeping force may represent a mass. In either case, the larger the value of the parameter is, the more difficult it is for the position of a voxel to change, and the smaller the value of the parameter is, the easier it is for the position of a voxel to change.

The virtual space constructing unit 22 is assumed to determine the value of this parameter of position keeping forces under various types of conditions like the ones below. For example, when arranging voxels to represent a user in the past as in the above-mentioned first example, the virtual space constructing unit 22 reduces position keeping forces of the voxels as distance images DM on the basis of which the voxels are arranged become older. In addition, a magnitude of the position keeping force may be determined depending on an arrangement position or a moving speed of each voxel. For example, by reducing the position keeping force as the moving speed increases, it can be made more difficult to keep a shape while in motion. In addition, upon application of an external force due to collision with another object in a virtual space, and the like, the position keeping force may be lowered depending on the strength of the external force. Note that the position keeping force may be set for each voxel or may be set for each subject. If the position keeping force are set for each subject, similarly to the first example in the above-mentioned first embodiment or the like, identification of subjects captured in a distance image DM is performed first, and position keeping forces of voxels to constitute each subject are determined depending on the position or moving speed of the subject.

In addition, position keeping forces of voxels may be changed depending on a part of the body of a user represented by the voxels. Specifically, the virtual space constructing unit 22 specifies, in a distance image DM, a part of a user such as the head, a hand, or a foot, and changes position keeping forces for each part. By way of example, a position keeping force for the head is increased, and a position keeping force for a part such as a hand or a foot may be reduced. Accordingly, it is possible to change how easily the shape of each part can change.

As described above, according to embodiments of the present invention, a variety of expressions with the voxels becomes possible by changing the various types of properties such as the sizes, the transparency, or the position keeping forces of the voxels to be arranged in the virtual space under the various types of conditions for each voxel. In addition, by making voxels with different sizes mixedly present in the virtual space, it becomes possible to express a place of importance, a place desired to be displayed in detail, and the like with small voxels, and at the same time, express a place of low importance or a place where details are desired to be hidden with large voxels to thereby reduce the overall amount of data.

Note that embodiments of the present invention are not limited to the ones described above. For example, although it is assumed that the first stereo camera 15 fixed in front of the user and the second stereo camera 16 fixed to the display device 14 acquire the distance images DM in the description above, the voxels may also be arranged on the basis of distance images DM acquired using stereo cameras that are installed at places other than them, behind the user or on a ceiling. In addition, another stereo camera may be also arranged in the display device 14, which stereo camera has an image capturing range including not only a space in front of the user but also a space next to or behind the user or the like. Accordingly, information of objects that are present in a wide range around the user can be acquired at a time without requiring the user to look around.

In addition, although it is assumed that the display device 14 is of a type to be worn on the head of the user in the description above, this is not the sole example, and the display device 14 may be a stationary display device or the like. In this case, the second stereo camera 16 may be or may not be fixed to the user separately.

In addition, in the description above, the distance images DM are assumed to be generated using a plurality of captured images obtained by a stereo camera. However, this is not the sole example, and the distance images DM may be ones generated by any method as long as they include information of distances D to subjects for each unit area in the distance images DM. Specifically, the information processing apparatus 1 may construct a virtual space using distance images DM generated by TOF methods or the like, for example.

In addition, the information processing apparatus according to the embodiments of the present Invention may acquire images other than the distance images DM, as images to be obtained by observing the reality space. For example, the information processing apparatus may analyze an image obtained by capturing the reality space by an infrared camera that senses highly heated places or another camera to specify a position of a subject in a three-dimensional space. In particular, the position of each subject present on the floor surface can be estimated using an image captured by a camera installed on the ceiling in the vertical direction. In addition, the information processing apparatus may specify the position of each subject captured in a captured image using a motion sensing technique called optical flow or the like. The information processing apparatus determines the arrangement positions of the voxels in a virtual space on the basis of the positions of the subjects captured in this image. Furthermore, the information processing apparatus may estimate three-dimensional shapes of the objects captured in the image using an estimator constructed by machine-learning or the like. In addition, it may estimate that a subject has a predetermined thickness in a predetermined direction, and determine the arrangement positions of voxels. According such an approach, a virtual space that reproduces subjects captured in the reality space with voxels can be constructed even if distance images DM cannot be acquired.

REFERENCE SIGNS LIST

1 Information processing apparatus, 11 Control unit, 12 Storage unit, 13 Interface unit, 14 Display device, 15 First stereo camera, 16 Second stereo camera, 21 Distance image acquiring unit, 22 Virtual space constructing unit, 23 Display control unit.

The invention claimed is:
1. An information processing apparatus comprising:
an image acquiring unit acquiring an image obtained by observing a reality space in which one or more subjects are present; and
a virtual space constructing unit constructing a virtual space to express a subject captured in the acquired image by arranging a plurality of unit volume elements at positions that are determined depending on the subject, wherein the image acquiring unit acquires a plurality of images obtained by observing the subject at different times, wherein the virtual space constructing unit constructs the virtual space on a basis of the plurality of images, wherein parameters of position keeping forces indicating how easily positions of individual unit volume elements of the plurality of unit volume elements change are set to the individual unit volume elements, and wherein the virtual space constructing unit arranges, in the virtual space, multiple types of unit volume elements having the position keeping forces that are different from one other.

2. The information processing apparatus according to claim 1, wherein, on a basis of the plurality of images, the virtual space constructing unit arranges, in the virtual space, a plurality of unit volume elements having properties that change over time.

3. The information processing apparatus according to claim 2, wherein, depending on a times at which the image is obtained, the virtual space constructing unit changes a size of a unit volume element to be arranged on a basis of the image.

4. The information processing apparatus according to claim 3, wherein the virtual space constructing unit reduces the size of the unit volume element to be arranged on a basis of the image, as a length of time that passes since the image is obtained increases.

5. The information processing apparatus according to claim 1, wherein the virtual space constructing unit simultaneously arranges, in the virtual space, unit volume elements on a basis of individual images of the plurality of images.

6. The information processing apparatus according to claim 1, wherein the virtual space constructing unit changes position keeping forces of the unit volume elements over time.

7. The information processing apparatus according to claim 1, wherein, depending on the position keeping forces, the virtual space constructing unit changes, over time, a shape of a subject constituted by the plurality of unit volume elements.

8. An information processing method comprising:

acquiring an image obtained by observing a reality space in which one or more subjects are present; and constructing a virtual space to express a subject captured in the acquired image by arranging a plurality of unit volume elements at positions that are determined depending on the subject, wherein, in the image acquisition step, a plurality of images obtained by observing the subject at different times are acquired, wherein, in the virtual space construction step, the virtual space is constructed on a basis of the plurality of images, wherein parameters of position keeping forces indicating how easily positions of individual unit volume elements of the plurality of unit volume elements change are set to the individual unit volume elements, and wherein the virtual space constructing step arranges, in the virtual space, multiple types of unit volume elements having the position keeping forces that are different from one other.

9. A non-transitory computer readable medium having stored thereon a program for a computer, the program comprising:

by an image acquiring unit, acquiring an image obtained by observing a reality space in which one or more subjects are present; and by a virtual space constructing unit, constructing a virtual space to express a subject captured in the acquired image by arranging a plurality of unit volume elements at positions that are determined depending on the subject, wherein the image acquiring unit acquires a plurality of images obtained by observing the subject at different times, wherein the virtual space constructing unit constructs the virtual space on a basis of the plurality of images, wherein parameters of position keeping forces indicating how easily positions of individual unit volume elements of the plurality of unit volume elements change are set to the individual unit volume elements, and wherein the virtual space constructing unit arranges, in the virtual space, multiple types of unit volume elements having the position keeping forces that are different from one other.

* * * * *